US006970780B2

(12) United States Patent
Smithberger et al.

(10) Patent No.: US 6,970,780 B2
(45) Date of Patent: Nov. 29, 2005

(54) SYSTEM AND METHOD FOR TRANSITIONING BETWEEN ENGINE DEVICE SCHEDULES BASED ON ENGINE OPERATING CONDITION

(75) Inventors: Patrick Smithberger, Northville, MI (US); Stephen Cooper, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 10/708,181

(22) Filed: Feb. 13, 2004

(65) Prior Publication Data

US 2005/0182552 A1 Aug. 18, 2005

(51) Int. Cl.[7] .......... F02P 9/00
(52) U.S. Cl. .......... 701/102
(58) Field of Search .......... 701/102, 103, 701/115

(56) References Cited

U.S. PATENT DOCUMENTS 4,947,817 A * 8/1990 Ido .......... 123/406.32
5,168,851 A 12/1992 Itoyama et al. .......... 123/399
5,239,963 A 8/1993 Ikebe et al. .......... 123/419
5,927,252 A 7/1999 Atsumi .......... 123/406.2
6,571,783 B1 * 6/2003 Denz et al. .......... 123/609

* cited by examiner

*Primary Examiner*—Hieu T. Vo
(74) *Attorney, Agent, or Firm*—Donald J. Lewis; Dykema Gossett PLLC

(57) ABSTRACT

A method and system are provided for controlling a device in an internal combustion engine such as a spark plug, a camshaft actuator, an EGR valve actuator, etc. The method and system are designed to compensate for changes in environmental operating conditions of the engine not accounted for in control variable scheduling. A parameter value is determined responsive to one or more engine operating conditions (e.g., ambient temperature, engine oil temperature, etc.). Potential values for the parameter are divided into predetermined value ranges. A schedule of control values for the device is then selected from among a plurality of control value schedules for the device responsive to the parameter value. Each control value schedule in the plurality of control value schedules corresponds to one of the aforementioned value ranges for the parameter. The device is then controlled responsive to a control value obtained from the selected control value schedule.

20 Claims, 5 Drawing Sheets

SYSTEM AND METHOD FOR TRANSITIONING BETWEEN ENGINE DEVICE SCHEDULES BASED ON ENGINE OPERATING CONDITION

BACKGROUND OF INVENTION

1. Field of the Invention

This invention relates to engine control systems and, in particular, to a method and system for controlling various devices in an internal combustion engine based on variations in engine operating conditions.

2. Discussion of Related Art

In recent years advances such as variable cam timing, variable valve lift, and charge motion control have introduced additional degrees of freedom and increased complexity to engine control. In response, an engine control system has been developed known as the "lockstep" system in which devices in the engine are simultaneously controlled without explicitly compensating for the interdependence between the devices.

In the lockstep system, a series of points are chosen spanning the engine speed/engine load domain. At each point, various devices are adjusted until the combination of settings provides a desired result. For example, one result might be "stability limited" (SL) operating conditions in which optimal fuel economy and optimal emission levels are attained for a predetermined ambient temperature. Another result might be "optimal power" (OP) operating conditions in which an optimal output torque (i.e., wide open throttle) is attained for a predetermined altitude. Another result might be "default" (D) or "limp home" (LH) operating conditions resulting from, e.g., locked camshaft actuators which occasionally result from certain conditions such as cold temperatures or low oil pressure in the engine. Control values for each device in the engine are scheduled according to these determinations.

The lockstep system has one drawback. The control value schedules are generally determined for the various engine devices in a fixed operating environment that does not account for variations in environmental operating conditions such as ambient air temperature, engine coolant temperature, engine oil temperature and humidity. Instead, these environmental operating conditions are assumed to be constant during control value scheduling. Optimum values for controlling various engine devices, however, may vary responsive to changes in environmental operating conditions. For example, variable cam position may be limited by engine oil temperature.

The inventors herein have recognized a need for a method and system for controlling a device in an internal combustion engine that will minimize and/or eliminate one or more of the above-identified deficiencies.

SUMMARY OF INVENTION

The present invention provides a method and system for controlling a device in an internal combustion engine of a vehicle.

A method in accordance with the present invention may include the step of determining a value for a parameter responsive to a first operating condition of the engine. The operating condition may, for example, comprise any of a wide variety of environmental operating conditions such as ambient air temperature. The parameter may also be a function of more than one operating condition of the engine. The parameter is capable of assuming a plurality of values and the plurality of values are divided into a plurality of predetermined value ranges. The method further includes the step of selecting a control value schedule for the device from among a plurality of control value schedules responsive to the parameter value. Each of the plurality of control value schedules corresponds to at least one of the plurality of predetermined value ranges for the parameter. The method further includes the step of controlling the device responsive to a control value obtained from the selected control value schedule.

A system in accordance with the present invention may include an electronic control unit configured to perform the steps of the above-identified method. In particular, the electronic control unit may be configured to determine a value for a parameter responsive to a first operating condition of the engine wherein the parameter is capable of assuming a plurality of values and the plurality of values are divided into a plurality of predetermined value ranges. The electronic control unit may be further configured to select a control value schedule for the device from among a plurality of control value schedules responsive to the parameter value wherein each of the plurality of control value schedules corresponds to at least one of the plurality of predetermined value ranges for the parameter. The electronic control unit may further be configured to control the engine device responsive to a control value obtained from the selected control value schedule.

A system and method in accordance with the present invention are advantageous. The inventive system and method enable improved control of both devices within the engine and the engine itself. In particular, the inventive system and method enable optimization of control values for various engine devices responsive to variations in environmental operating conditions.

These and other advantages of this invention will become apparent to one skilled in the art from the following detailed description and the accompanying drawings illustrating features of this invention by way of example.

DETAILED DESCRIPTION

Figure 1:
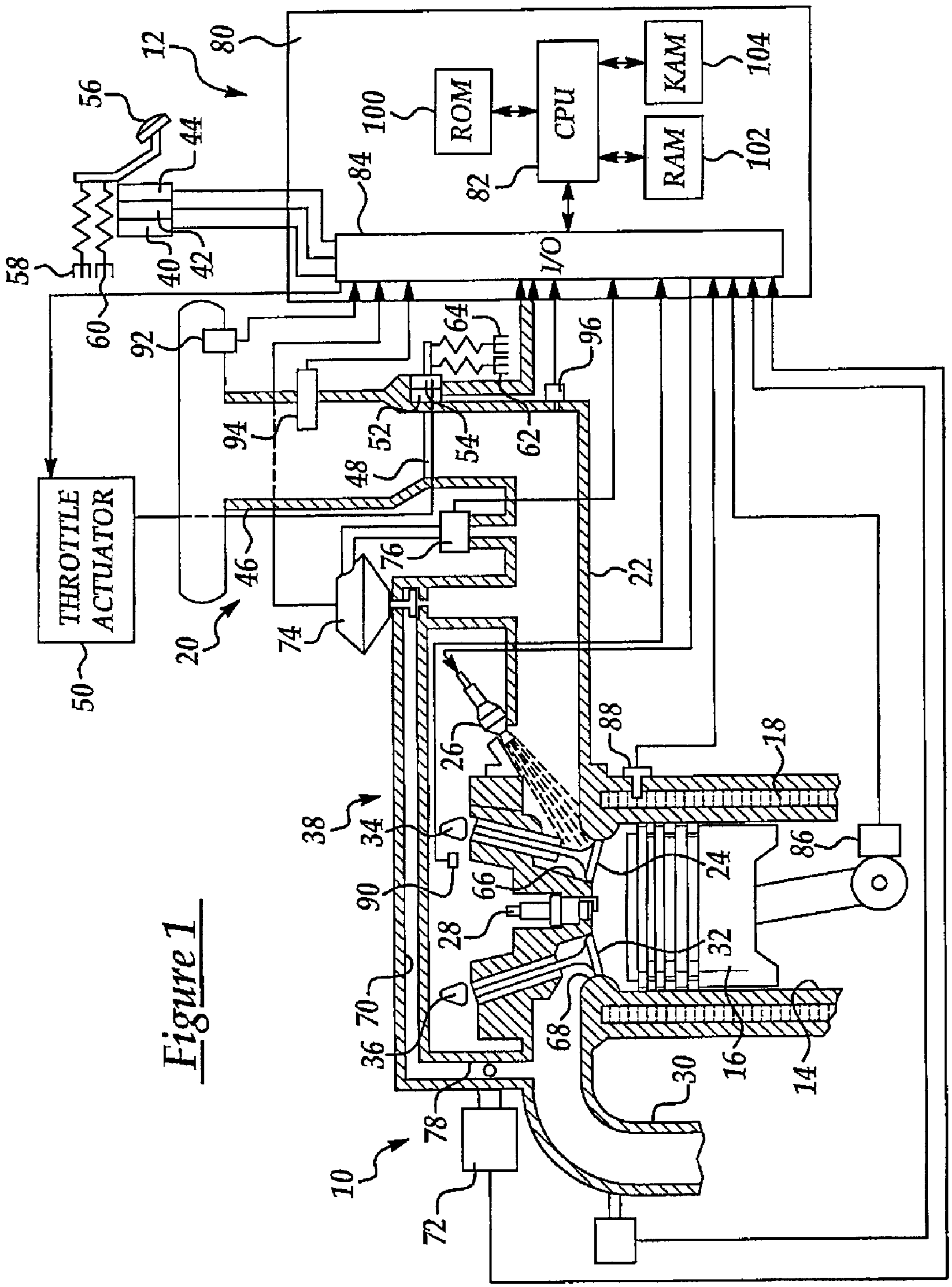
FIG. 1 is a schematic diagram illustrating an internal combustion engine incorporating a system in accordance with the present invention for controlling one or more devices of the engine.

Referring now to the drawings wherein like reference numerals are used to identify identical components in the various views, FIG. 1 illustrates an internal combustion engine 10 and a system 12 in accordance with the present invention. System 12 is used to control one or more devices in engine 10.

Engine 10 is designed for use in a motor vehicle. It should be understood, however, that engine 10 may be used in a wide variety of applications. Engine 10 provides motive energy to a motor vehicle or other device and is conventional in the art. Engine 10 may comprise an internal combustion engine. Engine 10 may define a plurality of combustion chambers or cylinders 14 and may also include a plurality of pistons 16, coolant passages 18, a throttle assembly 20, an intake manifold 22, intake valves 24, fuel injectors 26, spark plugs 28, an exhaust manifold 30, exhaust valves 32, camshafts 34, 36, and an engine gas recirculation (EGR) system 38.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Throttle assembly 20 controls the amount of air delivered to intake manifold 22 and cylinders 14. Assembly 20 is conventional in the art and may include a one or more pedal position sensors 40, 42, 44, a throttle body 46, a throttle plate 48, an actuator 50, and one ore more throttle position sensors 52, 54.

Pedal position sensors 40, 42, 44 are provided to detect the position of the vehicle accelerator pedal 56. Sensors 40, 42, 44 are conventional in the art may comprise potentiometers. Sensors 40, 42, 44 generator pedal position signals that may be input to the vehicle's electronic control unit. The signals are indicative of the position of pedal 56. As will be understood by those in the art, pedal 56 may be urged to a normal position by one or more springs 58, 60.

Throttle body 46 provides an inlet for air provided to engine 10. Throttle body 46 is conventional in the art and is generally cylindrical in shape.

Throttle plate 48 regulates the amount of airflow through throttle body 48 and to engine 10. Plate 48 is conventional in the art and may be supported on a shaft having an axis of rotation perpendicular to the cylindrical axis of body 46. Plate 48 may be urged to a normal position by one more return springs 62, 64.

Actuator 50 controls the position of throttle plate 48 and is conventional in the art. Actuator 50 may be responsive to one or more control signals generated by the vehicle's electronic control unit.

Sensors 52, 54 generate position signals indicative of the angular position of throttle plate 48 within body 46. Sensors 52, 54 are conventional in the art and may comprise potentiometers.

Intake manifold 22 provides a means for delivering charged air to cylinders 14. Manifold 22 is conventional in the art. An inlet port 66 is disposed between manifold 22 and each cylinder 14.

Intake valves 24 open and close each intake port 66 to control the delivery of air to the respective cylinder 14. Intake valves 24 are conventional in the art. Although only one intake valve is shown in the illustrated embodiment, it should be understood that multiple intake valves may be used for each cylinder 14.

Fuel injectors 26 are provided to deliver fuel in controlled amounts to cylinders 14 and are conventional in the art. Although only one fuel injector 26 is shown in the illustrated embodiment, it will again be understood that engine 10 will include additional fuel injectors for delivering fuel to other cylinders 14 in engine 10.

Spark plugs 28 are provided to ignite the air/fuel mixture in cylinders 14. Spark plugs 28 are also conventional in the art. Although only one spark plug is shown in the illustrated embodiment, it should be understood that each cylinder 14 will include at least one spark plug 28. A conventional ignition system (not shown) such as a solid-state ignition system (i.e., a distributor-less system) may be used to deliver electrical current to spark plugs 28.

Exhaust manifold 30 is provided to vent exhaust gases from cylinders 14 after each combustion event. Manifold 30 is conventional in the art and may deliver exhaust gases to a catalytic converter (not shown). An exhaust port 68 is disposed between manifold 30 and each cylinder 14. The present invention provides a system and method for measuring the temperature of exhaust gas at an exhaust flange in manifold 30 where exhaust pipes from individual cylinders converge.

Exhaust valves 32 open and close each exhaust port 68 to control the venting of exhaust gases from the respective cylinder 14 and are also conventional in the art. Again, although only one exhaust valve is shown in the illustrated embodiment, it should be understood that multiple exhaust valves may be used for each cylinder 14.

Camshafts 34, 36 are provided to control the opening and closing of intake valves 24 and exhaust valves 32, respectively, in each of cylinders 14. Camshafts 34, 36 are conventional in the art and may be controlled by actuators (not shown) responsive to control signals generated by the vehicle's electronic control unit (ECU). Camshafts 34, 36 may have multiple cams disposed thereon having different cam profiles for variable control of intake valves 24 and exhaust valves 32.

EGR system 38 is provided to return a portion of the exhaust gases to cylinders 14 in order to reduce emissions of combustion by-products. EGR system 38 includes may include a passage 70, a differential pressure transducer 72, an EGR valve 74, and an valve actuator 76.

Passage 70 extends from exhaust manifold 30 to intake manifold 22. Passage 70 may define a metering orifice 78.

Transducer 72 generates a signal indicative of the pressure drop across orifice 78. Transducer 72 may be connected to pressure taps upstream and downstream of orifice 78. The signal generated by transducer 72 may be provided as an input to the vehicle's electronic control unit.

EGR valve 74 is conventional in the art and is provided to regulate the flow of recirculated exhaust gas from exhaust manifold 30 to intake manifold 22. EGR valve 74 may be pneumatically actuated.

Actuator 76 may comprise a vacuum modulating solenoid. Actuator 76 may be controlled responsive to a control signal from the vehicle's electronic control unit.

System 12 is provided to control various devices in engine 10 such as intake valves 24, fuel injectors 26, spark plugs 28, exhaust valves 32, throttle actuator 50, and EGR valve actuator 76 along with other devices not shown such as camshaft actuators, swirl control valves and/or cam profile switching devices. In this manner, system 12 controls, among other things, valve lift, compression ratio, and cam timing. System 12 may form part of a larger system for controlling engine 10. System 12 may include an electronic control unit (ECU) 80.

ECU 80 is provided to control engine 10. ECU 80 may comprise a programmable microprocessor or microcontroller or may comprise an application specific integrated circuit (ASIC). ECU 80 may include a central processing unit (CPU) 82 and an input/output (I/O) interface 84. Through interface 84, ECU 80 may receive a plurality of input signals including signals generated by sensors 40, 42, 44, 52, 54, 72 and other conventional sensors such as a profile ignition pickup (PIP) sensor 86, a engine coolant temperature sensor 88, a cylinder identification (CID) sensor 90, an air temperature sensor 92, a mass air flow (MAF) sensor 94, a manifold absolute pressure (MAP) sensor 96, and a Heated Exhaust Gas Oxygen (HEGO) sensor 98. Also through interface 84, ECU 80 may generate a plurality of output signals including one or more signals used to control fuel injectors 26, the ignition system for spark plugs 38, the actuators for camshafts 34, 36, and actuators 50 (for throttle plate 48), 76 (for EGR valve 74). ECU 80 may also include one or more memories including, for example, Read Only Memory (ROM) 100, Random Access Memory (RAM) 102, and a Keep Alive Memory (KAM) 104 to retain information when the ignition key is turned off.

Figure 2:
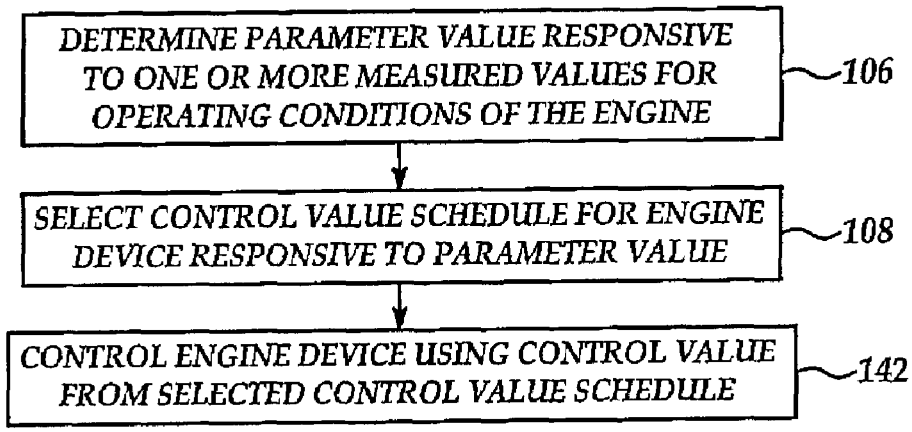
FIG. 2 is a flowchart diagram illustrating a method in accordance with the present invention for controlling one or more devices of the engine.

Referring now to FIG. 2, a method in accordance with the present invention for controlling a device in engine 10 will be described in detail. The inventive method or algorithm may be implemented by system 12 wherein ECU 80 is configured to perform several steps of the method by programming instruction or code (i.e., software). The instructions may be encoded on a computer storage medium such as a conventional diskette or CD-ROM and may be copied into one of memories 100, 102, 104 of ECU 80 using conventional computing devices and methods.

Referring to FIG. 2, a method in accordance with the present invention may begin with the step 106 of determining a value for a parameter responsive to an operating condition of engine 10. The operating conditions may comprise, for example, environmental operating conditions associated with engine 10 that are not compensated for in scheduling control values for devices in engine 10. Some exemplary environmental operating conditions are ambient air temperature, engine coolant temperature, engine oil temperature and humidity.

Step 106 may include several substeps. In particular, ECU 80 may be configured, or encoded, to receive a signal or signals indicative of a value associated with one or more operation conditions of engine 10. Values for operating conditions of the engine may be made in a conventional manner and the values may be directly measured or estimated. For example, ECU 80 may determine the ambient air temperature and engine coolant temperature responsive to signals received from sensors 92, 88, respectively. ECU 80 may then be configured, or encoded, to calculate a value for a parameter that is a function of the one or more engine operating conditions. It should be readily understood that the parameter may be derived from the engine operating conditions in a variety of ways (i.e., a variety of mathematical functions may be used to calculated the parameter value). The particular derivation of the parameter value may be dependant upon a number of design considerations associated with the function and performance of engine 10. One exemplary function for obtaining the parameter value may be written as follows:

$$\text{parameter\_value}=\text{tableA}(a1*\text{engine\_oil\_temp}+a2*\text{coolant\_temp})$$

Where a1 and a2 are constants that sum to 1.0, engine_oil_temp represents engine oil temperature, and coolant_temp represents engine coolant temperature and the parameter value is obtained from a lookup table stored in a memory such as one of memories 100, 102, 104. In an alternative function, coolant_temp may be replaced by the ambient temperature.

The parameter, as a function of one or more engine operating conditions, is capable of assuming a plurality of values. In accordance with the present invention, these values are divided into a plurality of predetermined value ranges. The value ranges preferably do not overlap and the values at either end or extreme of a value range define threshold values. For example, one value range may contains parameter values from 11–20, another value range may contain parameter values from 21–30, and another value range may contain parameter values from 31–40. Values 11, 20, 21, 30, 31, and 40 would be threshold values. It should be understood that the particular values and value ranges set forth herein are provided as an example only.

Figure 4:
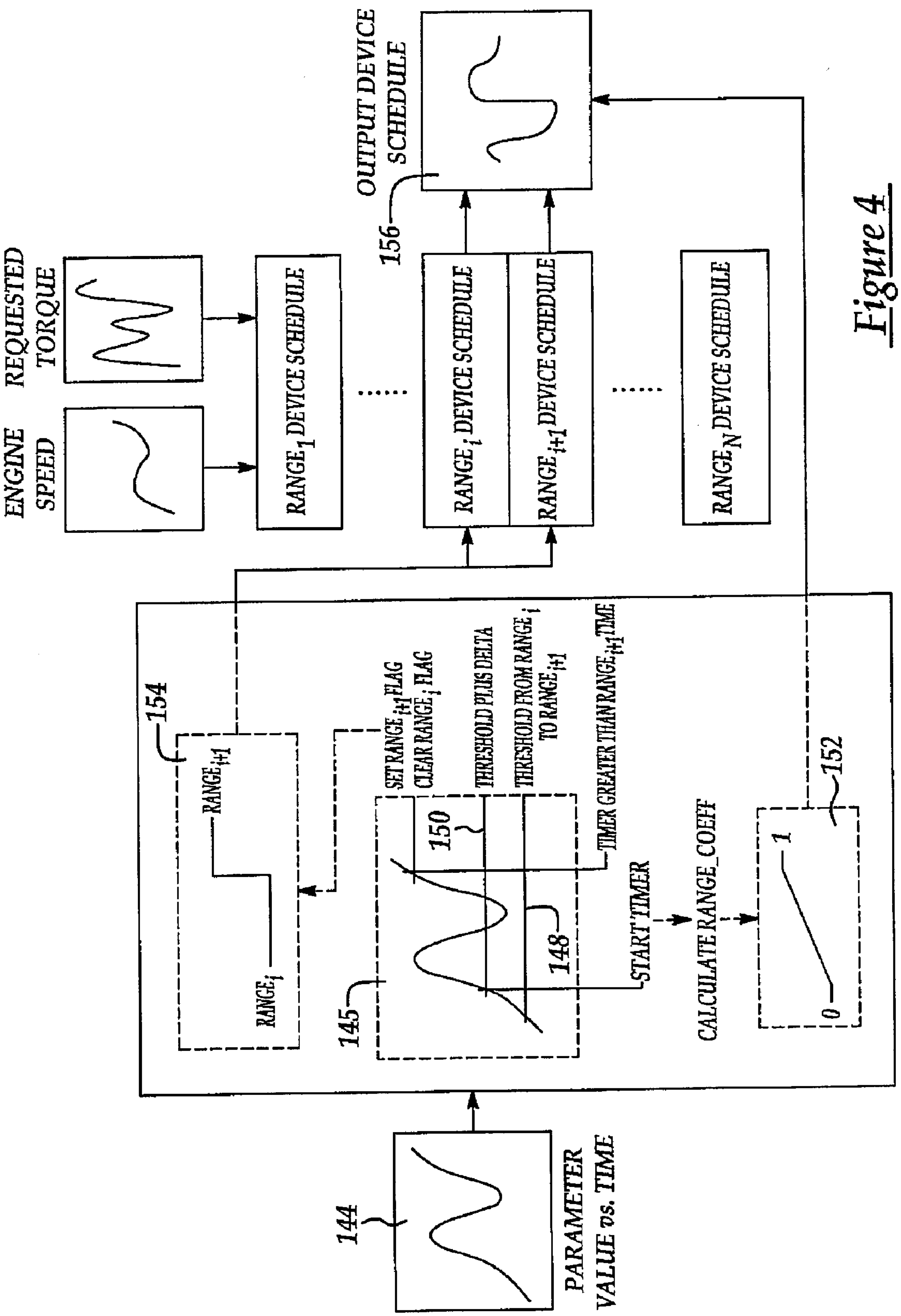
FIG. 4 is a schematic diagram illustrating a method in accordance with the present invention for controlling one or more devices of the engine.

The inventive method may continue with the step 108 of selecting a control value schedule for the device in engine 10 that is being controlled. The control value schedule is selected from among a plurality of control value schedules responsive to the previously obtained parameter value. Each control value schedule may comprises a data structure, such as a table, stored in a memory such as one of memories 100, 102, 104. The control values for a particular device may be scheduled against engine speed and load (as indicated in FIG. 4) or against other measurable operating conditions of engine 10. As discussed hereinabove, there may be multiple control value schedules for each engine device in order to achieve desired operating characteristics under predetermined engine operating conditions such as "Stability Limited," "Optimal Power," or "Limp Home" operating conditions. In accordance with the present invention, multiple control value schedules for each engine device are also determined responsive to environmental engine operating conditions quantified by the parameter value. Each of the control value schedules for each device correspond to at least one of the value ranges for the parameter. Accordingly, the value range into which the parameter value falls can determine the control value schedule that is used for the engine device. It should be understood that each control value schedule may correspond to more than one value range. It should also be understood that a control value schedule may comprise a static value stored in memory that is accessed and used to control an engine device irrespective of the engine speed, engine load or other operating condition.

Figure 3A:
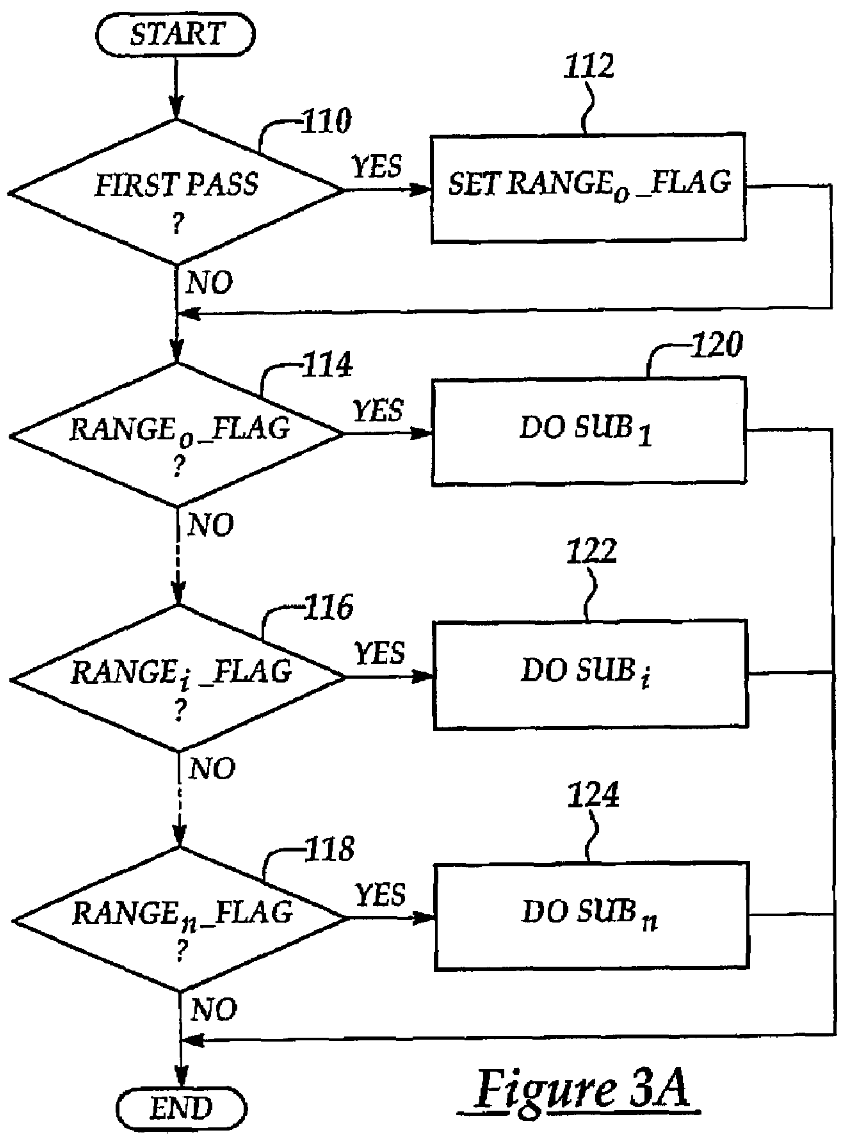
FIGS. 3A–3C are flowchart diagrams illustrating substeps of one embodiment of the inventive method.
Figure 3B:
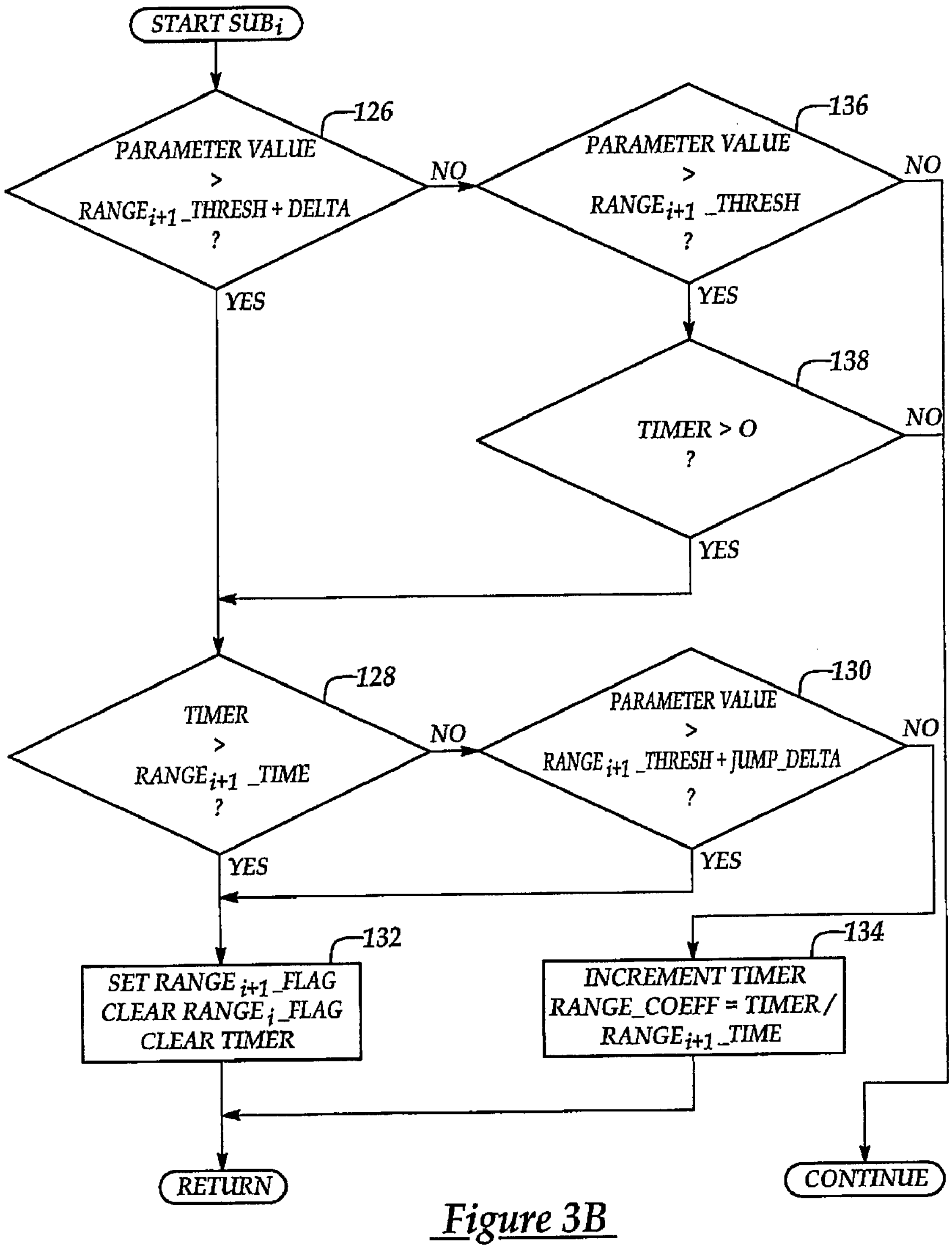
Figure 3C:
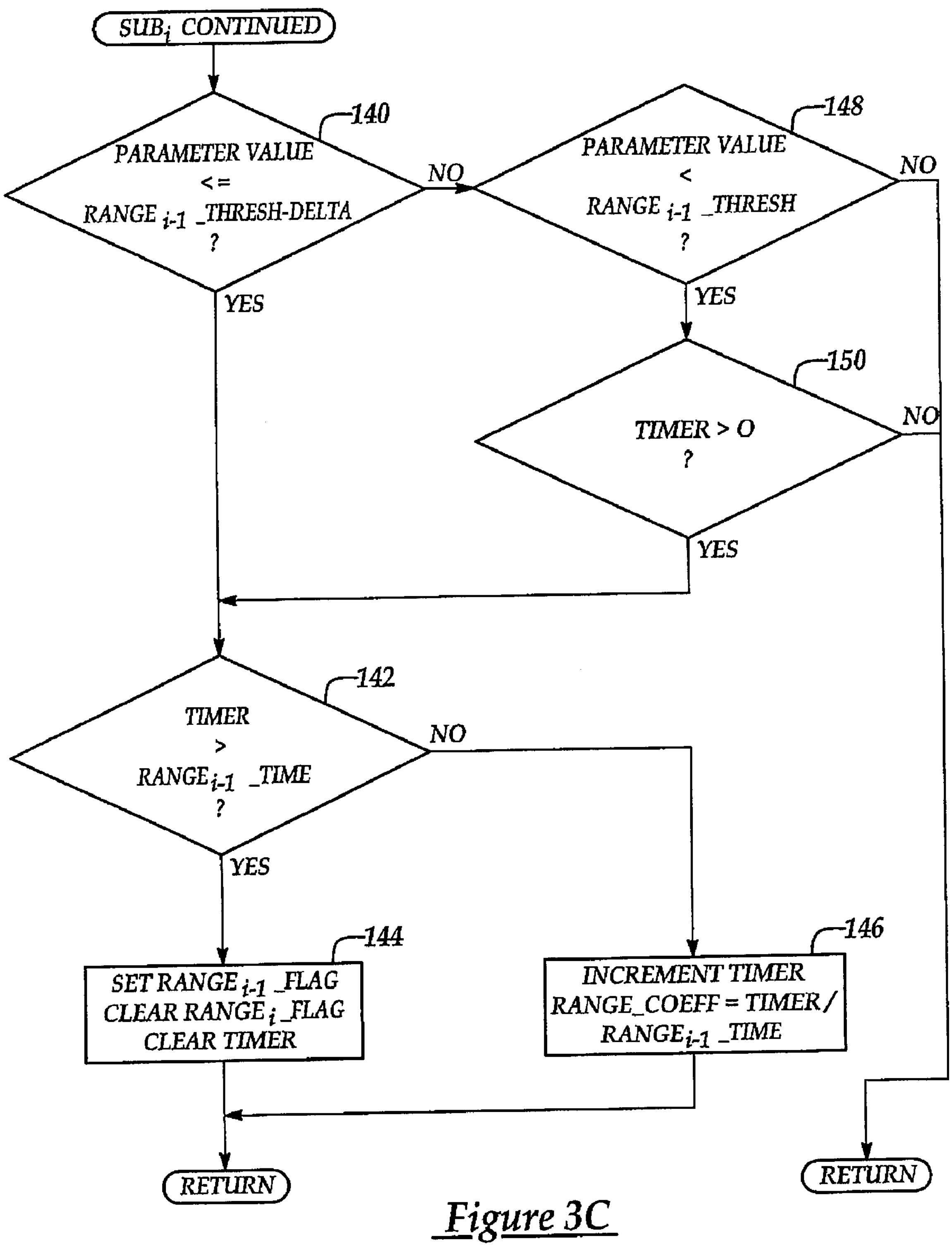

Step 108 may include several substeps. Referring now to FIGS. 3A–C and 4, one embodiment of the inventive method will be described in greater detail. Step 108 may begin with the substep of identifying a value range from among the plurality of predetermined value ranges responsive to the previously determined parameter value. Referring to FIGS. 3A–3C, ECU 80 may be encoded with a subroutine for implementing this substep. Referring to FIG. 3A, the subroutine may begin with a determination as to whether ECU 80 is executing the subroutine for the first time as indicated in block 110. If the subroutine is being executed for the first time, ECU 80 sets a flag $\text{Range}_0\text{\_Flag}$ as indicated in block 112. The flag $\text{Range}_0\text{\_Flag}$ along with other flags identified herein may be implemented by storing one of two values in a location in a memory such as one of memories 100, 102, 104. If the subroutine is not being executed for the first time, ECU 80 determines whether the flag $\text{Range}_0\text{\_Flag}$ is set as indicated in block 114. If the flag $Range_0$_Flag is not set, the subroutine continues on to determine whether any other flags $Range_1$_Flag . . . $Range_i$_Flag, . . . $Range_n$_Flag- - - each corresponding to one of the predetermined value ranges-are set as indicated in blocks 116, 118. Depending upon which flag is set, ECU 80 executes an appropriate subroutine as indicated in blocks 120, 122, 124.

Referring to FIG. 3B the substep of identifying a value range may include the substep of comparing the parameter value to a threshold value for a value range as indicated in block 126. In the illustrated embodiment, ECU 80 determines whether the parameter value is greater than the sum of a threshold value $Range_{i+1}$_Thresh for the subsequent value range and a predetermined amount Delta. The use of a predetermined amount Delta in addition to the threshold value $Range_{i+1}$_Thresh provides a hysteresis so that ECU 80 does not oscillate between value ranges. If the parameter value is greater, ECU 80 determines whether a timer value timer is greater than a predetermined timer value $Range_{i+1}$_Time for the subsequent value range as indicated in block 128. If the timer value is not greater, ECU 80 may perform the substep of comparing the parameter value to the sum of the threshold value $Range_{i+1}$_Thresh plus a second predetermined amount Jump__Delta as indicated in block 130. The amount Jump__Delta is greater than Delta. If the parameter value exceeds this sum, the subroutine selects the subsequent value range by setting the flag $Range_{i+1}$_Flag for the subsequent value range and clearing the flag $Range_i$_Flag for the current value range as indicated in block 132. The subroutine also clears the timer as indicated in block 132. The subroutine then ends as indicated in FIG. 3A until called again. The use of the comparison in block 130 allows ECU 80 quickly identify the appropriate value range by terminating the subroutine for a given value range quickly and moving through successive value ranges when the parameter value is changing rapidly. This may occur, for example, at key-on where engine operating conditions such as the engine coolant temperature and engine oil temperature are rapidly increasing. If the parameter value does not exceed the sum of $Range_{i+1}$_Thresh plus Jump__Delta, ECU 80 may be configured, to encoded, to implement the substep of incrementing the timer value timer as indicated at block 134. ECU 80 may also calculate a coefficient value Range__Coeff by dividing the timer value timer by the predetermined timer value $Range_{i+1}$_Time.

The coefficient value may be used by ECU 80 to implement a linear transition between control values for an engine device as described in greater detail hereinbelow.

Referring again to block 126, if the parameter value does not exceed the sum of the threshold value $Range_{i+1}$_Thresh and Delta, ECU 80 may determine whether the parameter value is greater than the threshold value $Range_{i+1}$_Thresh as indicated at block 136. If the parameter value is not greater, the subroutine continues as discussed hereinbelow with reference to FIG. 3C. If the parameter value is greater, ECU 80 determines whether the timer value timer has been previously incremented as indicated at block 138. If the timer value timer has not been incremented, the subroutine again continues as discussed hereinbelow with reference to FIG. 3C. If the timer value timer has been previously incremented, the subroutine continues in accordance with block 128 as discussed hereinabove. The comparisons in blocks 136, 138 ensure that the timer value timer continues to be incremented where the parameter value has previously attained a value greater than $Range_{i+1}$_Thresh and Delta and is now decreasing, but is still within the value range (i.e. above the threshold value for the value range).

Referring to FIG. 3C, the subroutine may continue as indicated in block 140 wherein ECU 80 may be configured, or encoded, to determine whether the parameter value is less than or equal to the threshold value $Range_{i-1}$_Thresh for a preceding value range minus a predetermined amount Delta. The use of a predetermined amount Delta in addition to the threshold value $Range_{i-1}$_Thresh again provides a hysteresis so that ECU 80 does not oscillate between value ranges. If the parameter value is less, ECU 80 may be configured, or encoded, to determine whether the timer value timer is greater than a predetermined timer value $Range_{i-1}$_Time as indicated in block 142. If the timer value timer is greater, ECU 80 may be configured, or encoded, to set the flag $Range_{i-1}$_Flag for the preceding value range, clear the flag $Range_i$_Flag for the current value range and clear the timer as indicated in block 144. The subroutine then ends as indicated in FIG. 3A until called again by ECU 80. If the timer value timer is less than the predetermined timer value $Range_{i-1}$_Time, ECU 80 may be configured, or encoded, to increment the timer value timer and calculates a coefficient Range__Coeff by dividing the timer value timer by the predetermined timer value $Range_{i-}$_Time as indicated in block 146. As set forth hereinabove, the coefficient value Range__Coeff may be used by ECU 80 to implement a linear transition between control values for an engine device.

Referring again to block 140, if the parameter value is not less than the threshold value $Range_{i-1}$_Thresh minus Delta, ECU 80 may be configured, or encoded, to determine whether the parameter value is less than the threshold value $Range_{i-1}$_Thresh as indicated at block 148. If the parameter value is not less, the subroutine ends until called again by ECU 80. If the parameter value is less, ECU 80 determines whether the timer value timer has been previously incremented as indicated at block 150. If the timer value timer has not been incremented, the subroutine again ends until called again. If the timer value timer has been previously incremented, the subroutine continues in accordance with block 142 as discussed hereinabove. The comparisons in blocks 148, 150 ensure that the timer value timer continues to be incremented where the parameter value has previously attained a value less than $Range_{i-1}$_Thresh minus Delta and is now increasing, but is still within the value range (i.e. below the threshold value for the value range).

Once a value range has been identified responsive to the parameter value, ECU 80 may be configured, or encoded, to perform the substep of choosing a control value schedule corresponding to the value range. A data structure may be maintained in one of memories 100, 102, 104 correlating the value range with control value schedules for each engine device to be controlled. It should be understood, however, that the corresponding control value schedule may be obtained in a variety of ways known in the art.

Referring again to FIG. 2, the inventive method may further include the step 142 of controlling the device of engine 10 responsive to a control value obtained from the selected control value schedule. ECU 80 may be configured, or encoded, to access the selected control value schedule responsive to, for example, engine speed and load and obtain a control value. ECU 80 may then use the control value to control device in a conventional manner.

Referring now to FIG. 4, a more specific example of the inventive method will be described to aid in understanding the invention. As shown in block 144, the value for a parameter varies over time. As set forth hereinabove, the parameter value may be a function of one or more operating conditions for the engine. Referring to block 146, the value of the parameter may initially be initially fall within a parameter value range $Range_i$.

As time passes, the value of the parameter may rise and exceed a threshold value 148 for the parameter value range $Range_{i+1}$.

As mentioned hereinabove, ECU 80 does not immediately select the control value schedule corresponding to $Range_{i+1}$ to prevent undesirable oscillation. Rather, a hysteresis is established. Therefore, and with reference to FIGS. 3B–C, ECU 80 will initially step through the comparisons at substeps 126, 136, 140, and 148 until the parameter value exceeds a the sum of the threshold value $Range_{i+1}$_Thresh plus a predetermined amount Delta (substep 126) or is less than the difference between the threshold value $Range_{i-1}$_Thresh minus a predetermined amount Delta (substep 140).

Referring again to FIG. 4 and block 146, the parameter value may continue to increase over time and eventually exceed the sum 150 of $Range_{i+1}$_Thresh and Delta. ECU 80 will then being incrementing a timer as indicated in block 146 by stepping through the substeps 126, 128, 130, 134 illustrated in FIG. 3B. The coefficient value Range_Coeff will also begin to increase linearly with the incrementation of the timer as illustrated in block 152 of FIG. 4. ECU 80 may continue to increment the timer even if the parameter value begins to decrease as illustrated in block 146. If the timer exceeds the predetermined timer value $Range_{i+1}$_Time corresponding to the parameter value range $Range_{i+1}$, ECU 80 will establish the parameter value range $Range_{i+1}$ as the current range and begin executing the subroutine for range $Range_{i+1}$ as illustrated in blocks 146, 154 of FIG. 4 and substeps 128, 132 of FIG. 3B.

In accordance with the present invention, ECU 80 controls engine control devices by obtaining values from control value schedules corresponding to the selected parameter value range. Referring to FIG. 4, in one embodiment of the invention ECU 80 may perform an interpolation between values obtained from multiple control value schedules (responsive to, e.g., engine speed and load) using the coefficient value Range_Coeff. In particular, ECU 80 may determine a control value for the engine control device responsive to control values taken from control value schedules for parameter value ranges $Range_i$, and $Range_{i+1}$ by using a multiplier for each control value based on the coefficient value Range_Coeff to generate an output as indicated in block 156.

A system and method in accordance with the present invention represent an improvement relative to the prior art. The inventive system and method enable improved control of devices within the engine and the engine itself. In particular, the inventive system and method enable optimization of control values for various engine devices responsive to variations in environmental operating conditions that are often unaccounted for during control variable scheduling.

What is claimed is:

1. A system for controlling a device in an internal combustion engine, comprising:

an electronic control unit configured to determine a value for a parameter responsive to a first operating condition of said engine, said parameter capable of assuming a plurality of values and said plurality of values divided into a plurality of predetermined value ranges, to select a control value schedule for said device from among a plurality of control value schedules responsive to said parameter value, each of said plurality of control value schedules corresponding to at least one of said plurality of predetermined value ranges, and to control said device responsive to a control value from said selected control value schedule.

2. The system of claim 1, wherein said device comprises a spark plug.

3. The system of claim 1 wherein said parameter value is determined responsive to said first engine operating condition and a second operating condition of said engine.

4. The system of claim 1 wherein said first engine operating condition comprises engine oil temperature.

5. The system of claim 1 wherein said electronic control unit is further configured, in selecting said control value schedule to identify a value range from among said plurality of predetermined value ranges responsive to said parameter value and to choose said control value schedule corresponding to said value range.

6. The system of claim 5 wherein said electronic control unit is further configured, in identifying said value range, to compare said parameter value to a threshold value for a first value range, to increment a timer value when said parameter value is within said first value range and said parameter value varies from said threshold value by a first predetermined amount, and to select said first value range when said timer value exceeds a predetermined timer value.

7. The system of claim 6 wherein said electronic control unit is further configured, in identifying said value range, to compare said parameter value to a sum of said threshold value plus a second predetermined amount, said second predetermined amount greater than said first predetermined amount, and to perform said comparing, incrementing and selecting for a second value range from among said plurality of predetermined value ranges when said parameter value exceeds said sum.

8. An article of manufacture, comprising:

a computer storage medium having a computer program encoded thereon for controlling a device in an internal combustion engine, said computer program including code for:

determining a value for a parameter responsive to a first operating condition of said engine, said parameter capable of assuming a plurality of values and said plurality of values divided into a plurality of predetermined value ranges;

selecting a control value schedule for said device from among a plurality of control value schedules responsive to said parameter value, each of said plurality of control value schedules corresponding to at least one of said plurality of predetermined value ranges; and, controlling said device responsive to a control value from said selected control value schedule.

9. The article of manufacture of claim 8 wherein said parameter value is determined responsive to said first engine operating condition and a second operating condition of said engine.

10. The article of manufacture of claim 8, wherein said first engine operating condition comprises engine oil temperature.

11. The article of manufacture of claim 8 wherein said code for selecting a control value includes code for:

identifying a value range from among said plurality of predetermined value ranges responsive to said parameter value; and, choosing said control value schedule corresponding to said value range.

12. The article of manufacture of claim 11 wherein said code for identifying a value range includes code for:

comparing said parameter value to a threshold value for a first value range;

incrementing a timer value when said parameter value is within said first value range and said parameter value varies from said threshold value by a first predetermined amount; and, selecting said first value range when said timer value exceeds a predetermined timer value.

13. The article of manufacture of claim 12 wherein said code for identifying a value range further includes code for:

comparing said parameter value to a sum of said threshold value plus a second predetermined amount, said second predetermined amount greater than said first predetermined amount; and, performing said comparing, incrementing and selecting substeps for a second value range from among said plurality of predetermined value ranges when said parameter value exceeds said sum.

14. A method for controlling a device in an internal combustion engine, comprising the steps of:

determining a value for a parameter responsive to a first operating condition of said engine, said parameter capable of assuming a plurality of values and said plurality of values divided into a plurality of predetermined value ranges;

selecting a control value schedule for said device from among a plurality of control value schedules responsive to said parameter value, each of said plurality of control value schedules corresponding to at least one of said plurality of predetermined value ranges; and, controlling said device responsive to a control value from said selected control value schedule.

15. The method of claim 14, wherein said device comprises a spark plug.

16. The method of claim 14 wherein said parameter value is determined responsive to said first engine operating condition and a second operating condition of said engine.

17. The method of claim 14 wherein said first engine operating condition comprises engine oil temperature.

18. The method of claim 14 wherein said selecting step includes the substeps of:

identifying a value range from among said plurality of predetermined value ranges responsive to said parameter value; and, choosing said control value schedule corresponding to said value range.

19. The method of claim 18 wherein said identifying step includes the substeps of:

comparing said parameter value to a threshold value for a first value range;

incrementing a timer value when said parameter value is within said first value range and said parameter value varies from said threshold value by a first predetermined amount; and, selecting said first value range when said timer value exceeds a predetermined timer value.

20. The method of claim 19 wherein said identifying step further includes the substeps of:

comparing said parameter value to a sum of said threshold value plus a second predetermined amount, said second predetermined amount greater than said first predetermined amount; and, performing said comparing, incrementing and selecting substeps for a second value range from among said plurality of predetermined value ranges when said parameter value exceeds said sum.

* * * * *